United States Patent
Bose et al.

(10) Patent No.: US 10,496,693 B2
(45) Date of Patent: Dec. 3, 2019

(54) UNIFIED CLASSIFICATION AND RANKING STRATEGY

(71) Applicant: ADOBE INC., San Jose, CA (US)

(72) Inventors: Shiladitya Bose, Kolkata (IN); Wei Zhang, Great Falls, VA (US); Arvind Heda, Ghaziabad (IN)

(73) Assignee: ADOBE INC., San Jose, CA (US)

( * ) Notice: Subject to any disclaimer, the term of this patent is extended or adjusted under 35 U.S.C. 154(b) by 533 days.

(21) Appl. No.: 15/168,699

(22) Filed: May 31, 2016

(65) Prior Publication Data
US 2017/0344633 A1    Nov. 30, 2017

(51) Int. Cl.
*G06F 16/35* (2019.01)

(52) U.S. Cl.
CPC .................. *G06F 16/358* (2019.01)

(58) Field of Classification Search
CPC ................................ G06F 17/30707
USPC .................................................. 707/739
See application file for complete search history.

(56) References Cited

U.S. PATENT DOCUMENTS

| | | | |
|---|---|---|---|
| 2005/0114130 A1* | 5/2005 | Java | G06F 17/30675 704/240 |
| 2006/0235841 A1* | 10/2006 | Betz | G06F 17/30864 |
| 2009/0240729 A1* | 9/2009 | Zwol | G06F 17/30017 |
| 2010/0070448 A1* | 3/2010 | Omoigui | H01L 27/1463 706/47 |
| 2014/0040275 A1* | 2/2014 | Dang | G06F 17/2785 707/741 |
| 2017/0255952 A1* | 9/2017 | Zhang | G06Q 30/0205 |

* cited by examiner

*Primary Examiner* — Uyen T Le
(74) *Attorney, Agent, or Firm* — Shook, Hardy & Bacon LLP

(57) ABSTRACT

Systems and methods provide for classification and ranking of features for a hierarchical dataset. A hierarchical schema of features from the dataset is accessed. A hierarchical rank is assigned to each feature based on its schema level in the hierarchical schema. Additionally, a semantic rank is assigned to each feature using a semantic model having ranked semantic contexts. The semantic rank of a feature is assigned by identifying a semantic context of the feature and assigning the rank of the semantic context as the semantic rank of the feature. A rank is computed for each feature as a function of its hierarchical rank and semantic rank.

20 Claims, 6 Drawing Sheets

UNIFIED CLASSIFICATION AND RANKING STRATEGY

BACKGROUND

The Internet has presented the ability to collect enormous amounts of data that was previously unattainable from just offline sources. This data provides rich information useful for various analytics, marketing, and other purposes. For instance, in the context of digital marketing, customer data can be used to build predictive models, providing marketers with predictive capabilities, such as identifying valuable customers or estimating likelihood that a product will be purchased.

Often, a large amount of data is available that can include hundreds of features. Exploring the data can be a very difficult and time consuming process given such a large number of features. One approach to working with datasets having a large number of features is to use classification to organize the features. For instance, semantic classification of features can be performed by classifying features in predefined semantic classes. This could be performed, for instance, using a dictionary-based approach in which a dictionary maps terms to each semantic class. Features are classified by a lookup in the dictionary using the feature names. However, this approach fails to classify features when a lookup in the dictionary for the feature names fails to find a match. As a result, such dictionary-based semantic classification results in a set of unclassified features. In some instances, this could be a large portion of the features.

SUMMARY

Embodiments of the present invention relate to, among other things, a classification and ranking strategy for hierarchical datasets. A hierarchical schema of features for a dataset is accessed. A hierarchical rank is assigned to each feature based on its schema level within the hierarchical schema. Additionally, a semantic rank is assigned to each feature using a semantic model having ranked semantic contexts. For a given feature, a semantic context of the feature is determined, and the rank for that semantic context is assigned as the semantic rank of the feature. A rank is computed for each feature as a function of its hierarchical rank and semantic rank. In some implementations, the semantic model includes entity, events, and activities semantic levels. When computing the rank for a feature, the semantic level of the feature is determined, and a ranking function is selected based on that semantic level to compute the rank for the feature. The features are grouped into categories based on rank, thereby providing classified and ranked features.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
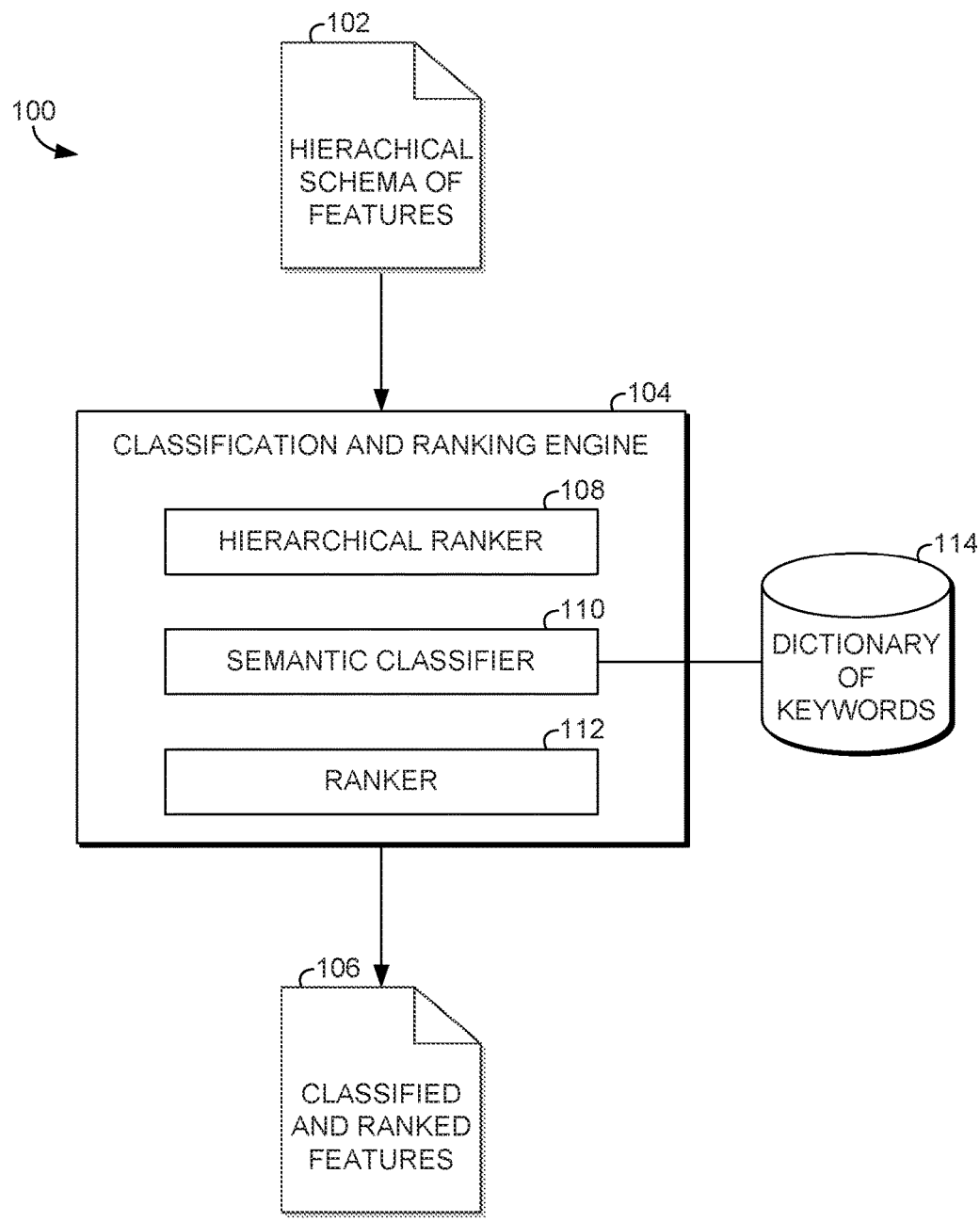
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention address the technical challenge of analyzing datasets having a large number of features by providing a unified classification and ranking strategy. A hierarchal schema of features for a dataset is processed to classify and rank the features. As used herein, the term "feature" refers to any attribute of a dataset. Generally, the features are ranked by assigning a hierarchical rank and semantic rank to each feature and computing each feature's rank as a function of its hierarchical rank and semantic rank. Features having a similar rank are grouped together into categories, providing a set of ranked groupings of features.

More particularly, given a hierarchical schema of features, each feature is assigned a hierarchical rank that corresponds to the level at which each feature occurs in the hierarchical schema. Generally, the lower the schema level of a feature, the more certainty is associated with the feature. The more certainty associated with a feature, the better is its likelihood to predict outcomes. The hierarchical rank reflects this. However, because different features at the same level in a hierarchical schema vary in certainty, hierarchical rank alone is insufficient. As such, embodiments herein also employ semantic information to classify and rank features. In particular, a semantic model is employed that sets forth a set of ranked semantic contexts. To assign a semantic rank to a given feature, the feature is analyzed to identify an appropriate semantic context, and the rank of that semantic context is assigned as the semantic rank for the feature. In some implementations, a dictionary-based approach is used in which a dictionary is provided that includes a set of keywords for each semantic context. A feature is classified by comparing its feature name to keywords for the various semantic contexts, and the feature is assigned the semantic context having a keyword in the dictionary matching its feature name.

The rank of each feature is computed as a function of its hierarchical rank and semantic rank. In some implementations, the semantic model employs a hierarchical view of an entity that includes entity, events, and actions semantic levels. When ranking a feature, the semantic level of the feature is identified, and a ranking function for that semantic level is employed to compute the rank for the feature. Features are then grouped into categories based on rank. As such, classified and ranked features are provided as a function of uncertainty associated with the features and the semantic contexts of the features. The approach provides this classification and ranking through analysis of the hierarchical schema structure and semantic information without requiring an analysis of a large dataset. The classified and ranked features can be employed for further analyses, such as feature selection and/or prediction modeling. The classification can also be used as a general purpose classification for any hierarchical dataset.

With reference now to the drawings, FIG. 1 is a block diagram illustrating an exemplary system 100 for classifying and ranking features in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a classification and ranking engine 104 configured to receive a hierarchical schema of features 102 as input and output classified and ranked features 106. The classification and ranking engine 102 may be provided, for instance, by an online marketing tool, such as the ADOBE ANALYTICS marketing tool (available from Adobe Systems Inc. of San Jose, Calif.) to perform feature analysis functions for digital marketing. The components shown in FIG. 1 can be implemented on one or more computing devices, such as the computing device 600 shown in FIG. 6.

Figure 2:
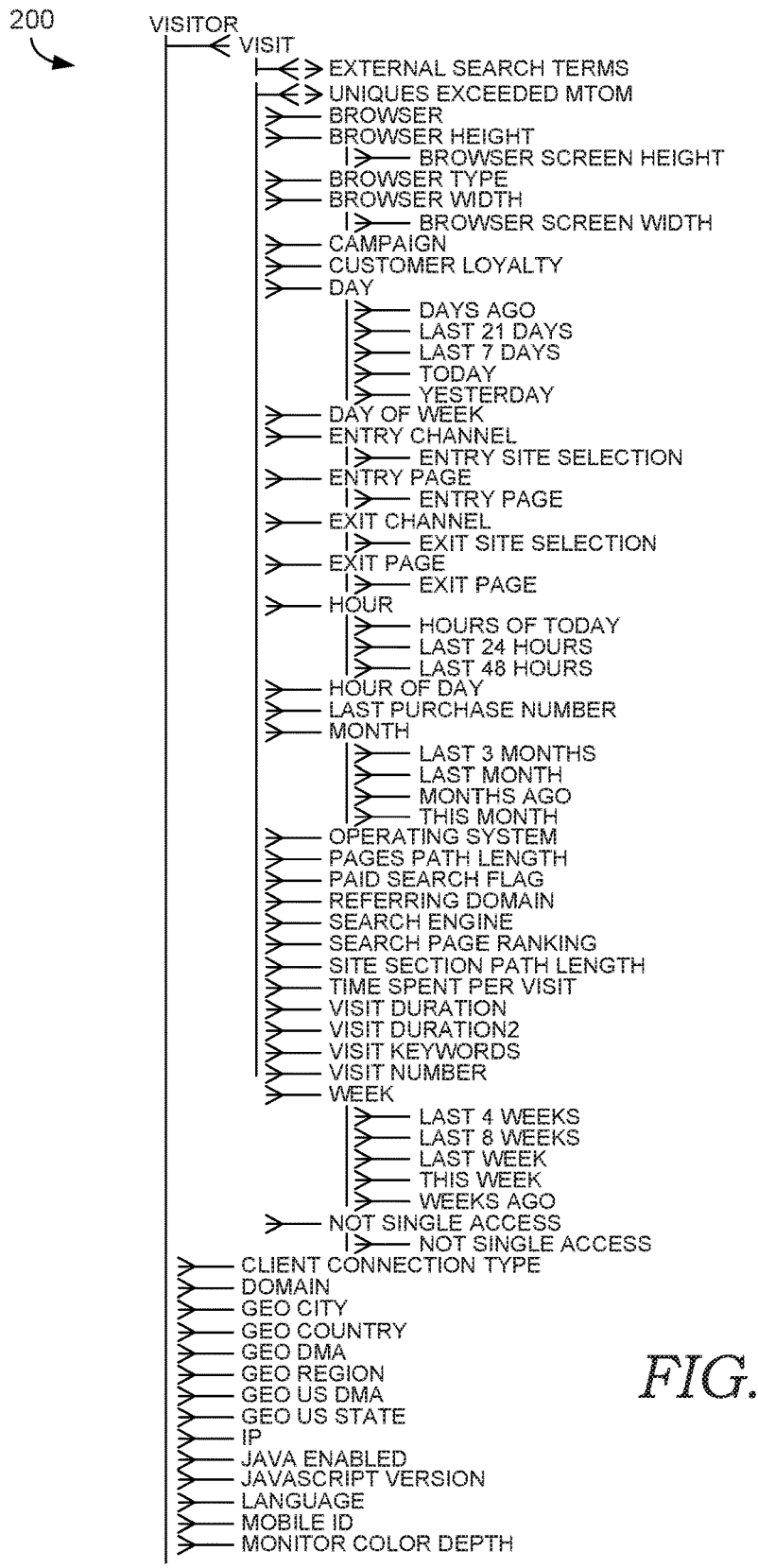
FIG. 2 is a diagram showing a sample schema that can be processed to classify and rank features in accordance with some implementations of the present disclosure.

The hierarchical schema of features 102 includes a hierarchical listing of features from a relevant dataset. By way of example, FIG. 2 illustrates a hierarchical schema of features 200 relating to attributes of visitors found in a dataset for an online store. While FIG. 2 provides an example of a hierarchical schema of features relating to visitors to an online store, it should be understood that implementations of the present disclosure apply to other types of datasets.

As shown in FIG. 1, the classification and ranking engine 102 includes a hierarchical ranker 108, semantic classifier 110, and ranker 112. The hierarchical ranker 108 operates to assign a hierarchical rank to each feature from the hierarchical schema of features 102. The hierarchical rank (H_Rank) for a feature (F) is equal to its level in the schema (SchemaLevel) as set forth below:

$$H\_Rank(F) = SchemaLevel(F)$$

Generally, the lower the hierarchical rank of a feature, the more certainty is associated with the feature. The more certainty associated with a feature, the better is its likelihood to predict outcomes. For instance, consider the hierarchical schema 200 of FIG. 2 modeling data for an online store. In this hierarchical schema, a visitor is associated with multiple visits and in each visit he/she has several page views. One metric could be a page count, which is the count of page views for a given webpage. A typical feature selection problem that could be posed for this dataset could be as follows: Which features help predict the likelihood of a page count greater than 10? A look at the hierarchical schema 200 would reveal that features like "Geo" and "Language" are associated with more certainty when answering this question. In particular, in the dataset corresponding with the hierarchical schema 200, a visitor is only associated with a fixed "Geo" and a single "Language." Hence, the likely number of visitor segments answering this question would be fewer as the number of combinations of visitor level attributes like "Geo" and "Language" satisfying the page count is likely to be limited.

However, an increase in the level of uncertainty occurs as features occur further deeper in the hierarchical schema 200. For example, considering features below the "Visit" level, each visitor is associated with multiple visits. As such, each feature below the "Visit" level, such as "Referring Domain" and "Search Engine," could be the same or different across visits for a single visitor. Thus, the likely number of segments satisfying the page count would be much larger as the number of combinations of "Visit" levels feature (e.g., "Referring Domain" and "Search Engine") which might satisfy the page count is much larger. This trend continues and the unpredictability in the values of features increases when traversing deeper in the hierarchical schema 200. Accordingly, this analysis provides the foundation for deriving a hierarchical rank for features in a hierarchical schema, such as the hierarchical schema 200.

While hierarchical rank helps to organize features, the inventors have observed that hierarchical rank is insufficient by itself. In particular, features at the same level in a hierarchical schema may have different levels of certainty. For instance, a look at the hierarchical schema 200 reveals that features "Browser," "Operating System" and "Referring Domain" have the same hierarchical rank (i.e., H_Rank=2) as these features are at the same level in the hierarchical schema 200 (i.e., level 2). However, the inventors have observed that despite their same H_Rank, the level of certainty for "Browser" and "Operating System" is typically higher than "Referring Domain." In particular, a visitor is more likely to use a similar "Browser" and "Operating System" across visits than have similar "Referring Domain."

Figure 3:
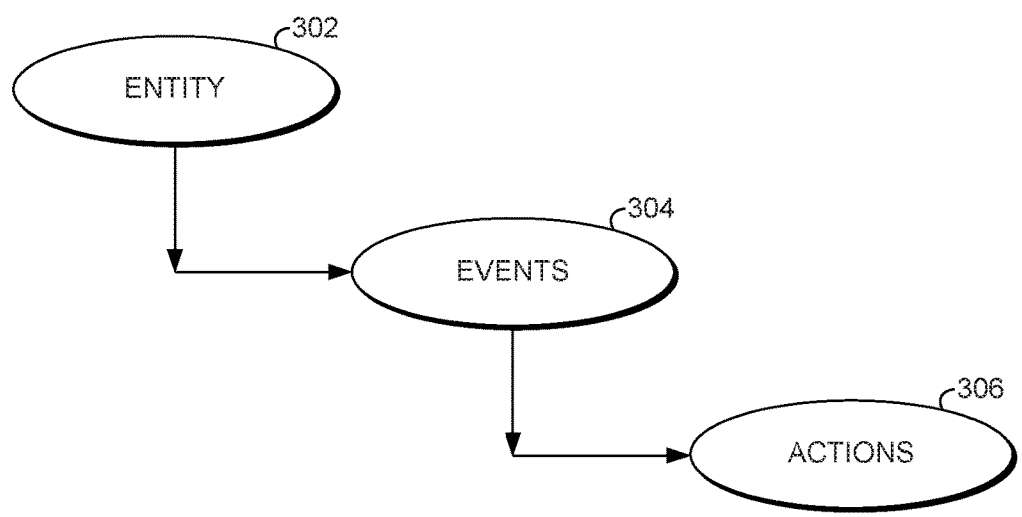
FIG. 3 is a diagram showing semantic levels used in accordance with some implementations of the present disclosure.

Thus, embodiments herein use not only hierarchical rank but also employ some semantic information for the features to classify and rank the features. To define the context-based semantic classification of features, embodiments use a semantic model based on a hierarchical view of an entity, as shown in FIG. 3. In this semantic model, every entity 302 participates in multiple events 304 and in each event performs a plethora of actions 306. As used herein, the three levels in this semantic model (namely entity 302, events 304, and actions 306) are called semantic levels. This hierarchical view is inspired by the model of a visitor visiting a web page and performing several actions during a visit to the web site. However, it should be noted that although the semantic model shown in FIG. 3 is inspired by a visitor visiting an online store, the semantic model can be applied to any general hierarchical dataset. For instance, the semantic model can be applied to a dataset in which the central entity is an offer and not a visitor. This semantic model works equally well for any of a variety of different datasets.

In addition to semantic levels, embodiments of the present disclosure employ semantic contexts. As noted above, the inventors have observed that features' likelihood of segmenting a customer population differs. For example, the inventors have observed that "Visit" level attributes like "Browser" and "Operating System" typically have a high likelihood of segmenting customer populations due to more certainty/consistency in user behavior, compared to other "Visit" level features like "Referring Domain." As such, embodiments use ranked semantic contexts to further facilitate ranking and classifying features. The semantic contexts have an associated rank based on their likelihood of segmenting a customer population.

Figure 4:
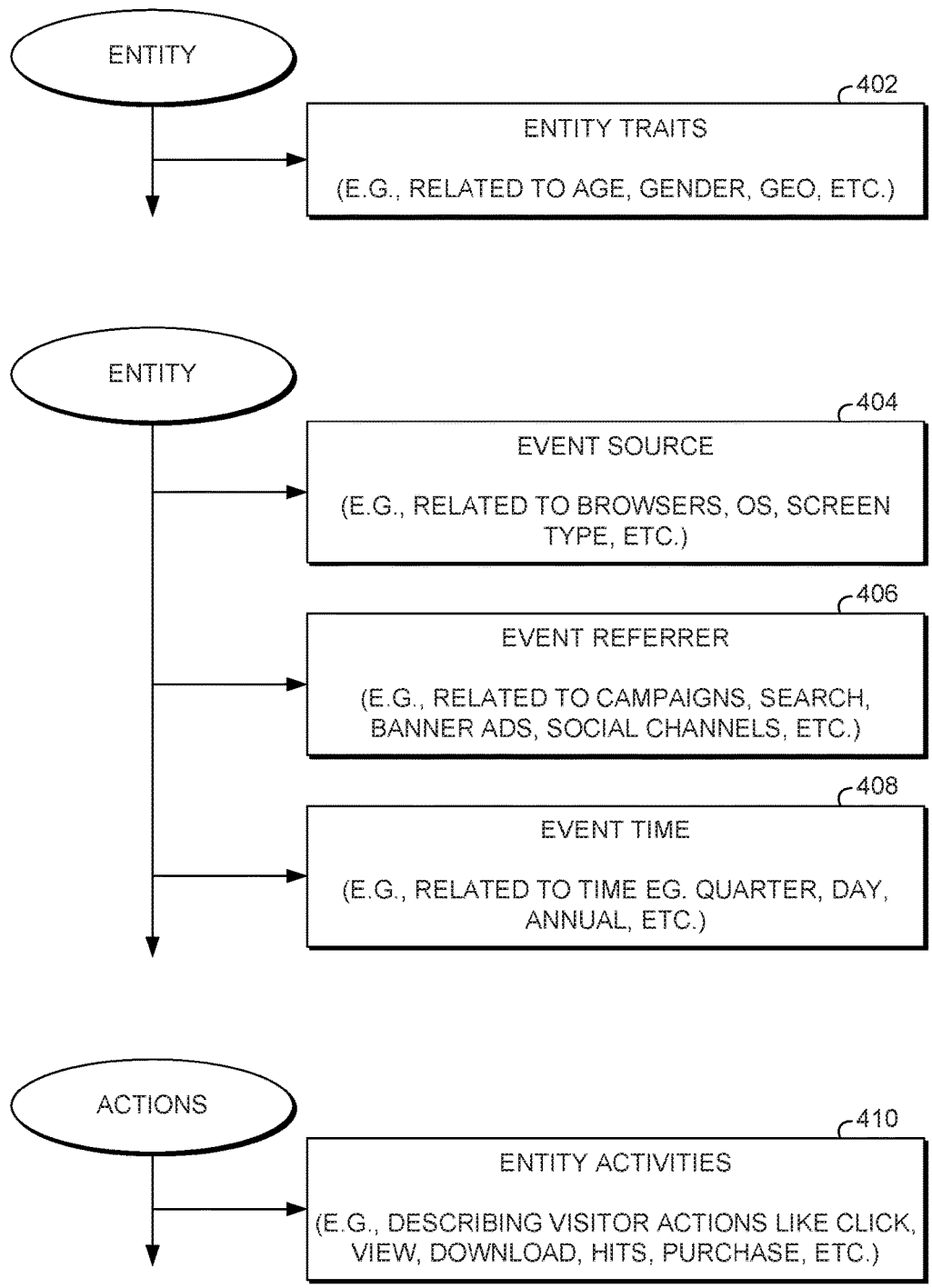
FIG. 4 is a diagram showing semantic contexts used in accordance with some implementations of the present disclosure.

FIG. 4 illustrates semantic contexts that are used in some implementations of the present disclosure. Each semantic context is associated with a predefined ranking. The semantic contexts and their associated ranks are as indicated below. In this ranking scheme, a lower rank implies higher priority:

Rank 1: Entity traits 402
Rank 2: Event source 404
Rank 3: Event referrer 406
Rank 4: Event activities 410
Rank 5: Event time 408
Rank 6: Miscellaneous (not shown in FIG. 4)

Entity traits comprise features describing an entity (e.g., demographics of a customer, such as age, gender, geo location, and language). Based on experience, the inventors identified that in the context of digital marketing, it is reasonable to expect customers to react to offers and various campaigns depending on entity traits, such as demographics. Hence, these features have a very high likelihood of segmenting a customer population with respect to a metric like conversion or revenue. As a result, some embodiments assign a rank 1 (top rank) to the entity traits semantic context.

Event source comprises features regarding the computing device used to access online resources, such as the browser used, operating system used, mobile or desktop device, etc. Based on experience, in the context of digital marketing, the inventors identified that it is reasonable to expect customers using different sources to access online resources (e.g., mobile versus desktop) to react differently to various offers and campaigns. As a result, some embodiments consider event source as the next best semantic context for segmenting a customer population with regard to metrics like conversion and revenue. Accordingly, some embodiments assign a rank 2 to the event source semantic context.

Customer segmentation also happens based on the referrer for an event (e.g., advertisements, social channel used by customers). For instance, a customer's behavior might vary with regard to a metric depending on the social channel (e.g., the FACEBOOK, TWITTER, GOOGLE PLUS social networks) via which the customer interacts with marketing resources. This is indicative of the customer's preference for a certain social media platform, and customers might respond very differently to the same campaign on different platforms. Accordingly, some embodiments assign a rank 3 to the event referrer semantic context.

Customer populations may also be segmented based on various entity activities. Features capturing information about various actions like click, view, download, purchase, additions, removal, and search fall under this semantic context. Sometimes, it is possible to detect a clear segment for some of the entity activities. For example, a feature like "last click tactic before purchase," which describes the form of a marketing campaign (e.g., banner ad, social, email, etc.) that was clicked by the customer before finally purchasing the product, may show clear segmentation of the customer population. Accordingly, some embodiments assign a rank 4 to the entity activities semantic context.

The event time semantic context includes temporal features describing some aspect regarding time. Some of the features in this semantic context may facilitate customer segmentation. For example, in the context of digital marketing, it is reasonable to expect seasonal trends in customer behavior. Thus, features describing seasons (summer, winter, spring etc.) have an impact on customer segmentation, for instance, in case of an apparel dataset. This may be especially true for temporal features describing annual events. Accordingly, some embodiments assign a rank 5 to the event time semantic context.

Finally, some features may not fall into any of the above five semantic contexts. Accordingly, a miscellaneous semantic context may be employed to captures these features. In some embodiments, a rank 6 is assigned to the miscellaneous semantic context.

It should be understood that the semantic contexts and the specific ranking of the semantic contexts described above are provided by way of example only and not limitation. Various embodiments of the present invention may use semantic contexts not described above and/or may exclude some of the semantic contexts described above. Additionally, an alternative ranking of the semantic contexts may be employed. Any and all such variations are contemplated to be within the scope of embodiments of the present invention.

Referring again to FIG. 1, the semantic classifier 110 determines a semantic context for each feature from the hierarchical schema 102 and assigns a semantic rank to each feature based on its corresponding semantic context (i.e., the predefined semantic rank for its semantic context). The semantic classifier 110 identifies semantic contexts for features using any of a number of different classification approaches. In one particular embodiment, the semantic classifier 110 employs a dictionary-based approach for identifying semantic contexts for the features from the hierarchical schema 102. In particular, a dictionary 114 is provided that includes a set of keywords for each semantic context. The dictionary 114 may be designed, for instance, by looking at various datasets and literature regarding digital marketing, such as digital marketing glossaries, to select keywords for each semantic context. By way of example only and not limitation, the keywords for the entity traits semantic context could include: age, gender, city, country, geo, longitude, latitude, and region; the keywords for customer source include: browser, operating system, operating system (OS), and mobile; the keywords for the event source semantic context could include: banner, blog, email, social, and search; the keywords for the event referrer semantic context could include: facebook, youtube, twitter, and yahoo; the keywords for the entity activities semantic context could include: searched, click, view, touch, order, visit, download, launch, clickthrough, find, addition, removal, checkout, exit, signup, share, review, entry, spent, abandon, and purchase; and the keywords for the event time semantic context could include: after, annual, before, biennial, calendar, year, time, day, decade, delay, early, fiscal, fortnight, future, hour, later, minute, month, night, annum, period, premature, quarter, second, schedule, season, and next.

The feature name of each feature is compared against the keywords associated with the semantic contexts. If the feature name of a feature matches a keyword from the set of keywords for a particular semantic context, that semantic context is identified for the feature, and the rank set for that semantic context is assigned to the feature as its semantic rank. For example, suppose that the keyword "click" is included in the set of keywords for the entity activities semantic context, which has a rank of 4. The presence of "click" in a feature name would cause the event activities semantic context to be identified for the feature and a semantic rank of 4 to be assigned to the feature.

In some instances, a feature could be classified into more than one semantic context. For instance, a feature directed to "mobile purchase" could be classified into the event source semantic context and entity activities semantic context (i.e., "mobile" is classified into the event source semantic context, and "purchase" is classified into the entity activities semantic context). Both the semantic contexts make sense in this example. To address this situation, some embodiments assign a feature that corresponds to more than one semantic context with a semantic rank for the highest ranked semantic context to which it corresponds. In the example of "mobile purchase," the event source semantic context would be identified for the feature since that semantic context is ranked higher than the entity activities semantic context.

As the keywords in the dictionary 114 can occur in various forms in feature names, some embodiments use a stemmer before comparing a word in the feature name to a keyword. For example, suppose a feature includes the word "clicked." Before comparing to keywords in the dictionary 14, the word "clicked" is stemmed to get the word click and then a comparison is made to identify the visitor actions semantic context.

The ranker 112 determines a rank for each feature from the hierarchical schema 102 as a function of the hierarchical rank and semantic rank assigned to each feature. A variety of different functions could be employed to compute a rank for features based on the hierarchical rank and semantic rank of the features. In some implementations of the present disclosure, a different ranking function is used based on a semantic level for each features.

Given the input hierarchical schema 102, a determination is made regarding what is an entity in the hierarchical schema 102, what is an event in the hierarchical schema 102, and what are the actions in the hierarchical schema 102. The root node (i.e., root feature) in the hierarchical schema 102 is identified as the entity. For instance, in the hierarchical schema 200 of FIG. 2, the root node is "Visitor," so visitor is the entity. The event level is the level at which a time dimension is defined. For example, in the hierarchical schema 200 of FIG. 2, the time dimension is defined at the level of the "Visit" feature. In this hierarchical schema 200, every visitor is associated with a bunch of visits and each visit happens at a certain time. So the event level in the hierarchical schema 200 corresponds with the level of the "Visit" feature. Regarding actions, any features that are activities that a user performs like hits and page views are considered actions.

Though the elements of the semantic model (namely entity, event and actions) have been identified in the hierarchical schema 102, the various contexts like event source, event referrer, entity traits may not necessarily be children of features of the hierarchical schema 102 identified as entity, event and actions. For example, a feature like "last referrer in a visit" has the event referrer context, but will be at the visitor (entity) level and not at the visit (event) level.

In some implementations, when ranking a feature, a semantic level is determined for the feature, and a ranking function is selected based on the semantic level. In some implementations, if the semantic level of the semantic context of a feature is entity, the following equation is used to derive the rank for the feature:

$$\text{Power} = (H\_Rank/\text{weight}) \times R_{SC}$$

$$\text{Rank} = e^{\text{Power}}$$

wherein H_Rank is the hierarchical rank of the feature, $R_{SC}$ is the semantic rank of the feature, and weight is a normalization factor.

In the semantic model, the root level in the schema is labeled as the entity. Thus, any feature belonging to an entity level semantic context, like entity traits loses importance exponentially the deeper it occurs in the schema (i.e., larger H_Rank). An exponential increase in rank is used as the uncertainty in the value of a feature increases exponentially the deeper the feature occurs in the hierarchical schema.

In some implementations, if the semantic level of the semantic context of a feature is events, the difference is determined between the hierarchical rank (i.e., schema level) of the feature and the schema level at which events are defined in the given schema. That difference is then used to derive the rank for the feature as indicated in the following equations:

$$H\_Rank\_diff = H\_Rank - Event\_Level$$

$$\text{Power} = (H\_Rank\_diff/\text{weight}) \times R_{SC}$$

$$\text{Rank} = e^{\text{Power}}$$

wherein H_Rank is the hierarchical rank of the feature, Event_Level is the schema level at which events are defined in the schema, $R_{SC}$ is the semantic rank of the feature, and weight is a normalization factor.

In the semantic model, if a feature has event semantic level and occurs at a level higher than the level at which events occur, the feature's rank reduces exponentially showing a reduction in uncertainty due to closeness to root and thus increasing importance. Alternatively, if a feature having event semantic level lies at a level deeper than events in the schema, there is an exponential increase in rank as the uncertainty in the value of a feature increases exponentially the deeper the feature occurs in the hierarchical schema.

In some implementations, if the semantic level of the semantic context of a feature is actions, the following equation (similar to SL=entity) is used to derive the rank for the feature:

$$\text{Power} = (H\_Rank/\text{weight}) \times R_{SC}$$

$$\text{Rank} = e^{\text{Power}}$$

wherein H_Rank is the hierarchical rank of the feature, RSC is the semantic rank of the feature, and weight is a normalization factor.

In the semantic model, the root level in the schema is labeled as the entity. Thus, any feature belonging to an actions level semantic context gains importance exponentially the higher it occurs in the schema (lower H_Rank). An exponential increase in rank is used as the uncertainty in the value of a feature increases exponentially the deeper the feature occurs in the hierarchical schema.

Features with the same (or similar) rank are grouped together. As such, the output from the classification and ranking engine 104 are ranked and classified features 106. The ranked and classified features 106 can be used for analyzing a dataset associated with the hierarchical schema 102. By way of example and not limitation, in some implementations, the ranked and classified features 106 may be employed for feature selection to select a reduced feature set, for instance, similar to the approach used in U.S. patent application Ser. No. 15/062,937, filed Mar. 7, 2016 (which is herein incorporated by reference in its entirety). The group of features with the lowest rank may be considered the best group when selecting features. Such a reduced feature set can be used to generate a predictive model, which is then employed to provide predictive capabilities. As is known in the art, a predictive model refers to a model used to predict an outcome given a set of input characteristics. For example, a predictive model could be directed to determining the likelihood of a customer purchasing a product given information regarding the customer. A predictive model can be built from features from a dataset using any of a variety of known machine-learning algorithms. While the classification and ranking approach described herein can be used for such feature reduction and/or predictive modeling, it should be understood that the approach can be used as a general purpose classification for any hierarchical dataset for a variety of different purposes.

Figure 5:
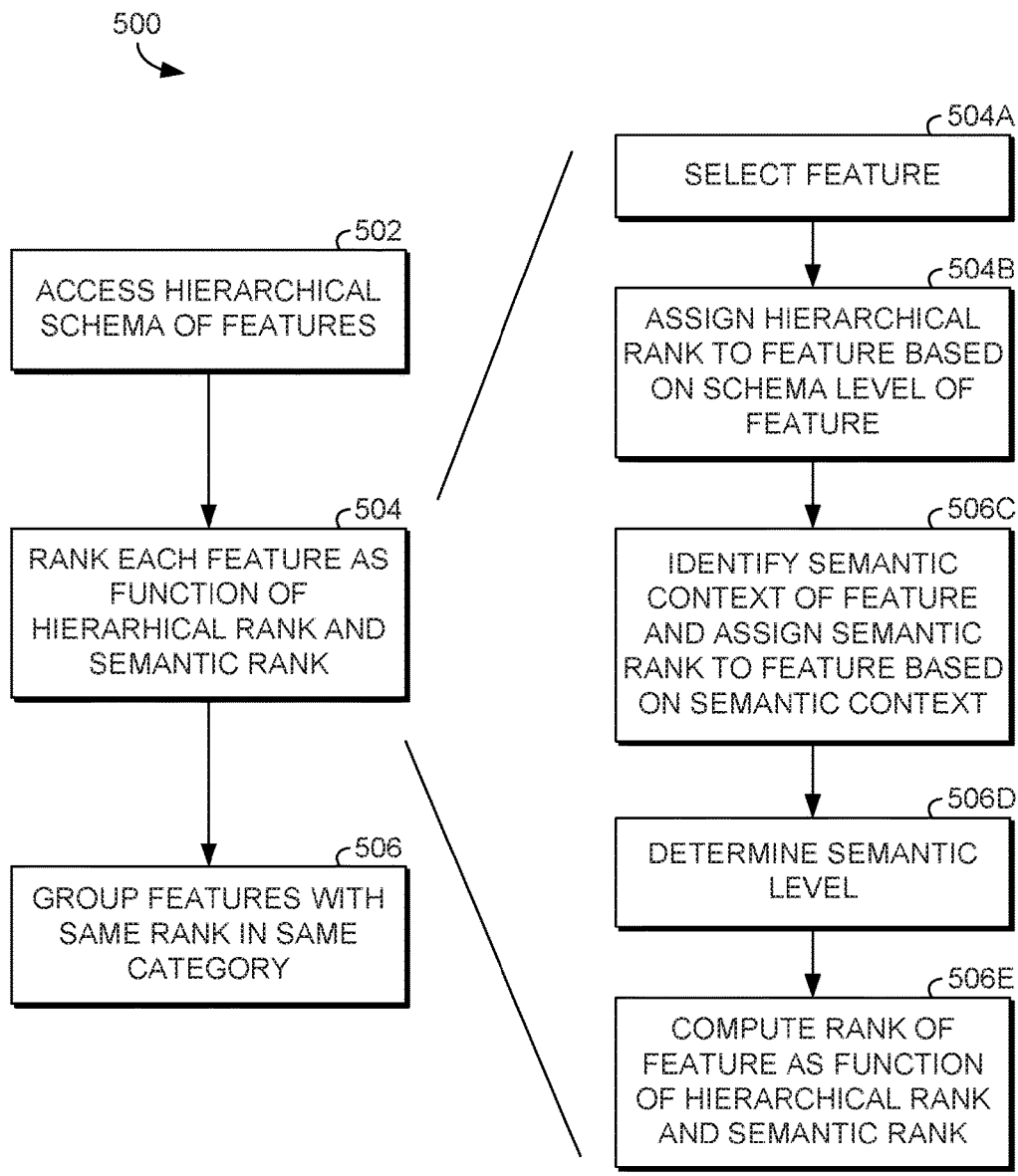
FIG. 5 is a flow diagram showing a method for classifying and ranking features from a hierarchical schema in accordance with some implementations of the present disclosure.

Referring next to FIG. 5, a flow diagram is provided illustrating a method 500 for classifying and ranking features from a hierarchical schema. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method 500 may be performed at least in part, for instance, by the classification and ranking engine 104 of FIG. 1.

As shown at block 502, a hierarchical schema of features is accessed. The hierarchical schema may be any hierarchical listing of features from a relevant dataset. A rank is computed for each feature as a function of a hierarchical rank and semantic rank for each feature, as shown at block 504.

The hierarchical rank for a feature is computed in some implementations as shown at blocks 504A-504E. A feature is initially selected at block 504A. A hierarchical rank is assigned to the feature, as shown at block 504B. The hierarchical rank for the feature corresponds to the schema level at which the feature is located within the hierarchical schema.

A semantic context is identified for the feature, and a predefined rank of that semantic context is assigned to the feature, as shown at block 506C. In some configurations, the semantic context of a feature is determined using a dictionary-based approach in which a number of semantic contexts are defined, and a group of keywords is provided for each semantic context. A feature is classified by comparing terms from the feature name for the feature against the keywords. When a term from the feature name matches a keyword for a particular semantic context, that semantic context is identified for the feature.

A semantic level is determined for the feature at block 506D. A rank is then computed for the feature based on the hierarchical rank and semantic rank of the feature, as shown at block 506E. A ranking function is selected based on the semantic level of the feature, and the rank for the feature is computed using that ranking function. Although FIG. 5 illustrates an approach in which a ranking function is used based on semantic level of the features, in other configurations, the semantic level is not determined, and the same ranking function is used for each feature.

Features from the input hierarchical schema are grouped into categories based on ranks, as shown at block 506. In particular, features with the same (or similar) rank are grouped into the same category. Accordingly, a set of classified and ranked features is provided as output, which can then be used for analytics purposes. For instance, the classification and ranking can be used for feature selection to provide a reduced feature set that can then be used to generate a predictive model. The predictive model may correspond with any desired predictive capability. The generation of predictive models from feature sets is well-known and therefore will not be described in further detail herein.

Figure 6:
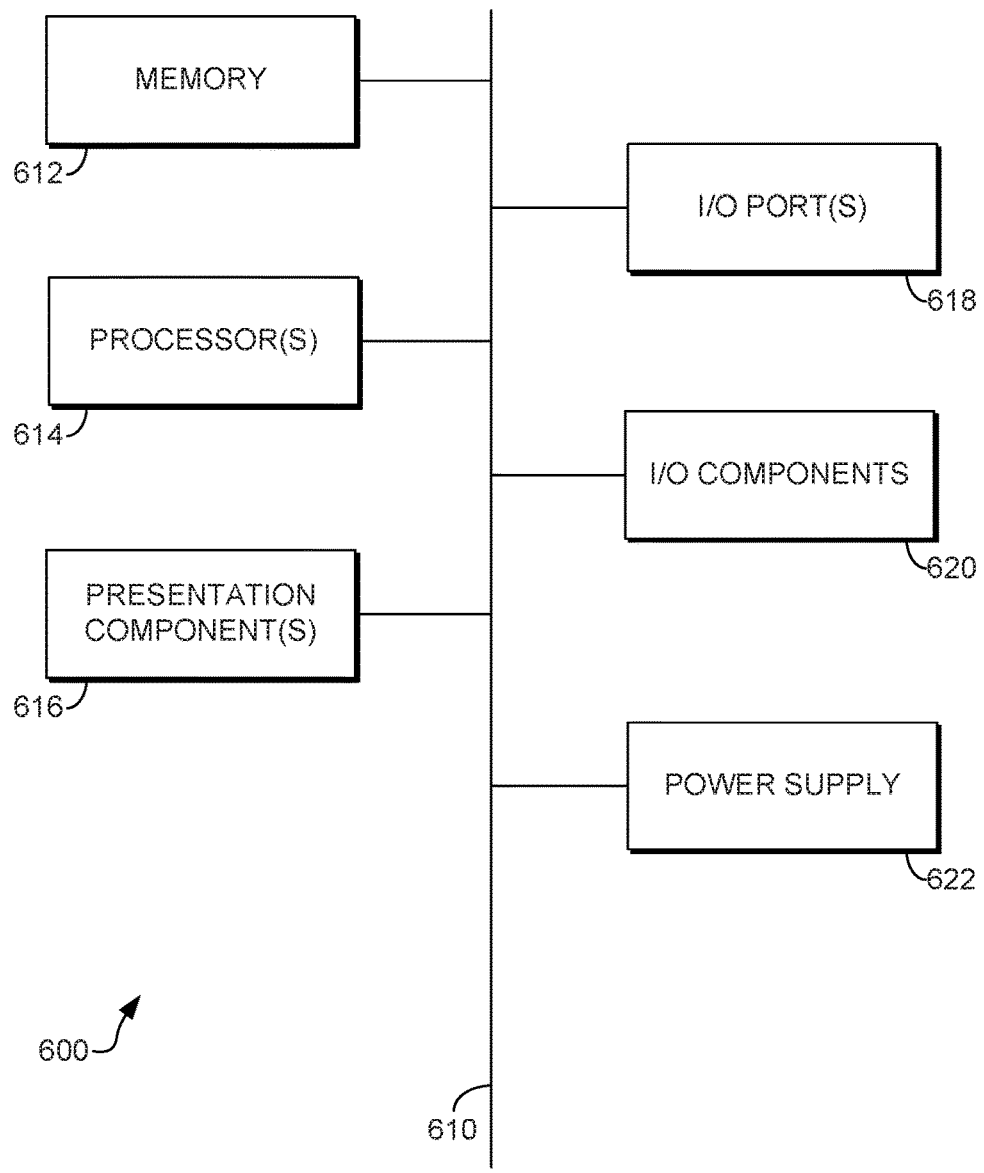
FIG. 6 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

As described above, implementations of the present disclosure relate to classifying and ranking features from a hierarchical schema using a unified classification and ranking approach. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for classifying features from a hierarchical schema of features, the method comprising:
    accessing the hierarchical schema of features;
    computing a rank for each feature, the rank for a given feature being computed by:
        assigning a hierarchical rank to the given feature based on a schema level of the given feature in the hierarchical schema,
        identifying a semantic context of the given feature from a semantic model setting forth a corresponding semantic rank for each of a plurality of semantic contexts,
        assigning, to the given feature, a semantic rank from the semantic model based on the semantic context of the given feature,
        determining a semantic level of the given feature from the semantic model, and
        computing the rank for the given feature as a function of the hierarchical rank of the given feature and the semantic rank of the given feature using a ranking function selected based on the semantic level of the given feature; and
    grouping subsets of features with similar rank into categories of features.

2. The method of claim 1, wherein the method further comprises:
    performing feature selection to select a reduced feature set using the categories of features; and
    generating a predictive model using features included in the reduced feature set.

3. The method of claim 1, wherein the semantic context for the given feature comprises one selected from the following: entity trait, event source, event referrer, event activity, and event time.

4. The method of claim 1, wherein identifying the semantic context of the given feature comprises:
    comparing a feature name of the given feature to keywords associated with each of the plurality of semantic contexts in the semantic model; and
    identifying a first semantic context from the plurality of semantic contexts based on the feature name of the given feature corresponding to at least one keyword associated with the first semantic context.

5. The method of claim 1, wherein the semantic level for the given feature comprises one selected from the following: an entity schema level, an event schema level, and an action schema level.

6. The method of claim 5, wherein when the schema level for the given feature comprises the entity schema level, the ranking function used to compute the rank for the given feature comprises:

$$Rank = e^{Power},$$

wherein:

$$Power = (H\_Rank/weight) \times R_{SC}, \text{ and}$$

wherein H_Rank is the hierarchical rank of the given feature, $R_{SC}$ is the semantic rank of the given feature, and weight is a normalization factor.

7. The method of claim 5, wherein when the schema level for the given feature comprises the event schema level, the ranking function used to compute the rank for the given feature comprises:

$$Rank = e^{Power},$$

wherein:

$$Power = (H\_Rank\_diff/weight) \times R_{SC},$$

wherein:

$$H\_Rank\_diff = H\_Rank - Event\_Level, \text{ and}$$

wherein H_Rank is the hierarchical rank of the feature, Event_Level is a schema level at which events are defined in the hierarchical schema, $R_{SC}$ is the semantic rank of the feature, and weight is a normalization factor.

8. The method of claim 5, wherein when the schema level for the given feature comprises the action schema level, the ranking function used to compute the rank for the given feature comprises:

$$Rank = e^{Power},$$

wherein:

$$Power = (H\_Rank/weight) \times R_{SC}, \text{ and}$$

wherein H_Rank is the hierarchical rank of the given feature, $R_{SC}$ is the semantic rank of the given feature, and weight is a normalization factor.

9. One or more computer storage media storing computer-useable instructions that, when executed by a computing device, cause the computing device to perform operations, the operations comprising:
 accessing a hierarchical schema of features;
 computing a rank for each feature, the rank for a given feature being computed by:
  assigning a hierarchical rank to the given feature based on a schema level of the given feature in the hierarchical schema,
  assigning a semantic rank to the given feature based on a semantic context of the given feature from a semantic model setting forth a corresponding semantic rank for each of a plurality of semantic contexts, and
  computing the rank for the given feature as a function of the hierarchical rank for the given feature and the semantic rank of the given feature; and
 grouping subsets of features with a similar rank into categories.

10. The one or more computer storage media of claim 9, wherein the semantic context for the given feature comprises one selected from the following: entity trait, event source, event referrer, event activity, and event time.

11. The one or more computer storage media of claim 9, wherein the semantic context of the given feature is determined by:
 comparing a feature name of the given feature to keywords associated with each of the plurality of semantic contexts in the semantic model; and
 identifying a first semantic context from the plurality of semantic contexts based on the feature name of the given feature corresponding to at least one keyword associated with the first semantic context.

12. The one or more computer storage media of claim 9, wherein the method further comprises:
 determining a semantic level of the given feature; and
 wherein the rank for the given feature is computed using a ranking function selected based on the semantic level of the given feature.

13. The one or more computer storage media of claim 12, wherein the semantic level for the given feature comprises one selected from the following: an entity schema level, an event schema level, and an action schema level.

14. The one or more computer storage media of claim 13, wherein when the schema level for the given feature comprises the entity schema level or the action schema level, the ranking function used to compute the rank for the given feature comprises:

$$Rank = e^{Power},$$

wherein:

$$Power = (H\_Rank/weight) \times R_{SC}, \text{ and}$$

wherein H_Rank is the hierarchical rank of the given feature, $R_{SC}$ is the semantic rank of the given feature, and weight is a normalization factor.

15. The one or more computer storage media of claim 13, wherein when the schema level for the given feature comprises the event schema level, the ranking function used to compute the rank for the given feature comprises:

$$Rank = e^{Power},$$

wherein:

$$Power = (H\_Rank\_diff/weight) \times R_{SC},$$

wherein:

$$H\_Rank\_diff = H\_Rank - Event\_Level, \text{ and}$$

wherein H_Rank is the hierarchical rank of the feature, Event_Level is a schema level at which events are defined in the hierarchical schema, $R_{SC}$ is the semantic rank of the feature, and weight is a normalization factor.

16. A computer system comprising:
 one or more processors; and
 one or more computer storage media storing computer useable instructions to cause the one or more processors to:
 access a hierarchical schema of features;
 compute a rank for each feature, the rank for a given feature being computed based on a hierarchical rank of the given feature and a semantic rank of the given feature, the hierarchical rank of the given feature corresponding to a schema level of the given feature in the hierarchical schema, and the semantic rank of the given feature being assigned based on a semantic context determined for the given feature based on a semantic model setting forth a corresponding semantic rank for each of a plurality of semantic contexts; and
 group subsets of features with a similar rank into categories.

17. The system of claim 16, wherein the semantic context for the given feature comprises one selected from the following: entity trait, event source, event referrer, event activity, and event time.

18. The system of claim 16, wherein the semantic context of the given feature is determined by:
   comparing a feature name of the given feature to keywords associated with each of the plurality of semantic contexts; and
   identifying a first semantic context from the plurality of semantic contexts based on the feature name of the given feature corresponding to at least one keyword associated with the first semantic context.

19. The system of claim 16, wherein the method further comprises:
   determining a semantic level of the given feature; and
   wherein the rank for the given feature is computed using a ranking function selected based on the semantic level of the given feature.

20. The system of claim 19, wherein the semantic level for the given feature comprises one selected from the following: an entity schema level, an event schema level, and an action schema level.

* * * * *